(12) United States Patent
Schweizer et al.

(10) Patent No.: US 10,901,236 B2
(45) Date of Patent: Jan. 26, 2021

(54) PACKAGING CONTAINER OF A CONTACT LENS

(71) Applicant: ALCON INC., Fribourg (CH)

(72) Inventors: Nils Schweizer, Bad König (DE); Kai Breburda, Bensheim (DE); Felix Brinckmann, Rossdorf (DE); Gabriela Cocora, Aschaffenburg (DE); Lukas Lomb, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 115 days.

(21) Appl. No.: 16/361,824

(22) Filed: Mar. 22, 2019

(65) Prior Publication Data
US 2019/0293961 A1   Sep. 26, 2019

Related U.S. Application Data

(60) Provisional application No. 62/646,414, filed on Mar. 22, 2018.

(51) Int. Cl.
*A45C 11/04* (2006.01)
*G02C 7/04* (2006.01)
*A45C 11/00* (2006.01)
*B65D 81/22* (2006.01)

(52) U.S. Cl.
CPC .............. *G02C 7/04* (2013.01); *A45C 11/005* (2013.01); *A45C 11/046* (2013.01); *B65D 81/22* (2013.01); *B65D 2585/545* (2013.01)

(58) Field of Classification Search
CPC ................ A45C 11/005; A45C 11/046; A45C 2011/006; B65D 81/22; B65D 2585/545; G02C 7/04

USPC ............................................ 206/5.1; 134/901
See application file for complete search history.

(56) References Cited

U.S. PATENT DOCUMENTS

| | | | | |
|---|---|---|---|---|
| 4,691,820 A | * | 9/1987 | Martinez | B65D 75/326 206/205 |
| 5,609,246 A | * | 3/1997 | Borghorst | B65D 1/30 206/5.1 |
| 6,050,398 A | * | 4/2000 | Wilde | B65D 75/326 206/205 |
| 6,474,465 B1 | * | 11/2002 | Jux | B65D 75/326 206/5.1 |

(Continued)

FOREIGN PATENT DOCUMENTS

| | | |
|---|---|---|
| EP | 1277416 A2 | 1/2003 |
| EP | 1930243 A1 | 6/2008 |
| WO | 2014095837 A1 | 6/2014 |

*Primary Examiner* — Luan K Bui
(74) *Attorney, Agent, or Firm* — Sheng-Hsin Hu

(57) ABSTRACT

A packaging container (1) for a contact lens comprises a shell (2). The shell (2) comprises a cavity (10) having a drop-shaped perimeter (12), and a flange (20) having a flat upper surface (22) extending around the drop-shaped perimeter (12) of the cavity (10) in an upper surface plane (24). The cavity (10) comprises a bowl portion (30) including an at least partially spherical section (32) for accommodating the contact lens, and a chamfer portion (40) surrounding the bowl portion (30). The chamfer portion (40) is arranged between the bowl portion (30) and the drop-shaped perimeter (12) of the cavity (10) and includes a tapered outlet section (42) forming a tip towards the flange (20) to facilitate removal of the contact lens from the cavity (10).

15 Claims, 3 Drawing Sheets

(56) References Cited

U.S. PATENT DOCUMENTS

| | | | |
|---|---|---|---|
| 6,889,825 B2 * | 5/2005 | Ichikawa | B65D 77/2032 |
| | | | 206/210 |
| 9,119,450 B2 * | 9/2015 | Lee | B65B 51/10 |
| 2011/0094898 A1 * | 4/2011 | Tang | G01M 11/0214 |
| | | | 206/5.1 |

* cited by examiner

US 10,901,236 B2

PACKAGING CONTAINER OF A CONTACT LENS

This application claims the benefit under 35 USC § 119 (e) of U.S. provisional application No. 62/646,414 filed 22 Mar. 2018, incorporated by reference in its entirety.

FIELD OF THE INVENTION

The present invention generally relates to the packaging of contact lenses, in particular the packaging of silicone hydrogel contact lenses. More particularly, the present invention relates to a packaging container for use as primary package for storing a contact lens in a preserving liquid.

BACKGROUND OF THE INVENTION

Typically, contact lenses are packaged in individual packaging containers, sometimes also known as blister packs, which serve as primary packages. Strips of such containers connected to each other by a sealing foil are further packaged in secondary packages, for example in cardboard boxes. The packaging containers generally consist of at least two parts: a shell, such as an injection-molded plastic shell defining a concave cavity adapted to accommodate a contact lens and a specific amount of a preserving liquid, and a cover foil heat-sealed to the shell such as to hermetically seal the contact lens preserving liquid and the contact lens within the cavity.

A packaging container of this type is described in U.S. Pat. No. 5,609,246. The shell of the container described there comprises a cavity and a flat flange extending in a plane around the perimeter of the cavity. The cavity comprises a bowl portion including a partially spherical section for storing the contact lens. To facilitate removal of the contact lens from the bowl portion, the cavity further comprises a ramp section laterally tapering away from the partially spherical section to form a tip towards the flange. As a result, the cavity and its perimeter have a drop-like shape. While this drop-shaped design has proven beneficially for a large variety of contact lenses, it has been observed that silicone hydrogel contact lenses—due to their very high flexibility—tend to curl, fold or invert in such drop-shaped container shells, in particular during handling of the containers. Yet, merely reducing the overall volume of the cavity to provide a closer confinement of the contact lens in order to prevent curling, folding or inversion is limited and rather undesirable. First, reducing the overall volume of the cavity requires the packaging process to be adapted, in particular with respect to the amount of preserving liquid to be filled into the cavity and with respect to the sealing parameters and sealing contour around the perimeter of the cavity. Second, a reduced overall volume of the cavity increases the risk of contact lenses getting sealed between the cover foil and she shell, since—due to the closer confinement—the contact lens may not be properly arranged in the cavity so that it may at least partially extend beyond the edge of the cavity. As a consequence, at least a portion of the contact lens inadvertently may be arranged in the area of the sealing contour so that during heat-sealing of the cover foil to the shell the contact lens may become "sandwiched" between the shell and the cover foil and may irreversibly get damaged. The respective packaging container (or the respective strip of containers connected to each other by the sealing foil) must be rejected, accordingly.

Therefore, it is an object of the invention to provide an improved packaging container for storing a contact lens, in particular a silicone hydrogel contact lens, which still provides for convenient removal of the contact lens but prevents curling, folding or inversion of the contact lens once placed in the shell. In addition, inadvertent "sandwiching" of the contact lens between the shell and the cover foil during sealing of the container should be prevented while at the same time keeping the overall drop-shape of the cavity and the sealing contour around the perimeter of the cavity unchanged.

SUMMARY OF THE INVENTION

In accordance with the present invention, these and other objects are met by a packaging container for a contact lens as it is specified by the features of the independent claim. Advantageous embodiments of the packaging container according to the invention are the subject of the dependent claims.

As used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the "about" is included and explicitly disclosed, unless the context clearly dictates otherwise. For example, if a range of "about" numerical value A to "about" numerical value B is disclosed, this is to be understood to include and explicitly disclose a range of numerical value A to numerical value B. Also, whenever features are combined with the term "or", the term "or" is to be understood to also include "and" unless it is evident from the specification that the term "or" must be understood as being exclusive.

According to the invention, a packaging container for a contact lens, in particular for a silicone hydrogel contact lens is suggested. The packaging container comprises a shell. The shell comprises a cavity having a drop-shaped perimeter and a flange having a flat upper surface extending around the drop-shaped perimeter of the cavity in an upper surface plane. The cavity comprises a bowl portion including an at least partially spherical section for accommodating the contact lens. In addition, the cavity comprises a chamfer portion surrounding the bowl portion and being arranged between the bowl portion and the drop-shaped perimeter of the cavity. The chamfer portion includes a tapered outlet section forming a tip towards the flange to facilitate removal of the contact lens from the cavity.

According to one aspect of the packaging container according to the invention, the bowl portion further includes a ramp section tapering away from the at least partially spherical section towards the tapered outlet section of the chamfer portion.

According to a further aspect of the packaging container according to the invention, a transition between the ramp section of the bowl portion and the outlet section of the chamfer portion is at least partially edgeless.

In accordance with yet a further aspect of the packaging container according to the invention, a transition between the at least partially spherical section of the bowl portion and a section of the chamfer portion other than the outlet section has an edge.

According to a further aspect of the packaging container according to the invention, the at least partially spherical section of the bowl portion extends across an azimuthal angular range of at least 180° around a center axis of the at least partially spherical section, the center axis extending perpendicular to the upper surface plane through the center of the at least partially spherical section.

According to still a further aspect of the packaging container according to the invention, the chamfer portion is angled with respect to the upper surface plane of the flange by an inclination angle in the range of 20° and 45°.

In accordance with another aspect of the packaging container according to the invention, at least in a section other than the tapered outlet section the chamfer portion is angled with respect to the upper surface plane of the flange by an inclination angle in the range of 25° and 45°.

In accordance with a further aspect of the packaging container according to the invention, in the tapered outlet section the chamfer portion is angled with respect to the upper surface plane of the flange by an inclination angle in the range of 20° and 45°.

According to another aspect of the packaging container according to the invention, at least in a section of the chamfer portion other than the tapered outlet section, the chamfer portion is straight-lined in a cross-sectional plane including the center axis of the at least partially spherical section.

According to still a further aspect of the packaging container according to the invention, in the tapered outlet section the chamfer portion is straight-lined in a cross-sectional plane including the center axis of the at least partially spherical section.

According to a further aspect of the packaging container according to the invention, the chamfer portion has a maximum depth in a direction perpendicular to the upper surface which is in the range of 1 mm and 2.5 mm (millimeters).

According to yet a further aspect of the packaging container according to the invention, at least along a perimeter of the at least partially spherical section of the bowl portion the chamfer portion has a radial width parallel to the upper surface plane which is in the range of 1 mm and 2.5 mm (millimeters).

According to still a further aspect of the packaging container according to the invention, at least along a perimeter of the at least partially spherical section of the bowl portion the chamfer portion has a constant radial width parallel to the upper surface plane.

In accordance with another aspect of the packaging container according to the invention, a radius of the at least partially spherical section of the bowl section is in the range of 7 mm (millimeters) and 9.5 mm (millimeters).

In accordance with yet another aspect of the invention, the cavity has a total volume in the range of 600 µl (microliters) and 900 µl (microliters).

According to a further aspect of the packaging container according to the invention, the packaging container further comprises a cover foil configured to be sealingly attached to the shell in a sealing zone on the upper surface of the flange.

The packaging container according to the present invention has a number of advantages. First, the packaging container according to the present invention advantageously prevents contact lenses from being inadvertently entrapped between the shell and the cover foil to be sealingly attached to the shell in a sealing zone on the upper surface of the flange. This is due to the presence of the chamfer portion that surrounds the bowl portion along the drop-shaped perimeter of the cavity. Thus, the chamfer portion advantageously forms a small, substantially ring-shaped zone about the rim area of the cavity on which the contact lens may not come to rest. As a consequence, the contact lens is prevented from reaching the sealing zone on the upper surface of the flange beyond the perimeter of the cavity and thus from getting entrapped between the shell and the cover foil during the sealing process.

At the same time, the chamfer portion advantageously allows for reducing the dimensions and thus the volume of the bowl portion such that a contact lens—once placed in the bowl portion of the cavity—is sufficiently confined so that it is prevented from curling, folding or inversion. Preferably, a radius of the at least partially spherical section of the bowl section may be in the range of 7 mm (millimeter) and 9.5 mm (millimeter). In general, the radius of the at least partially spherical section may be chosen such as to be slightly larger than or equal to a base curve equivalent radius of a front surface of the contact lens that is to be accommodated in the cavity of the packaging container. The base curve equivalent radius is used to approximate the radius of the back surface of a contact lens that contacts the user's eye. The back surface of a contact lens typically cannot be described by a portion of perfect sphere because the surface of the human eye to which the back surface should fit is not perfectly spherical. The base curve equivalent radius is determined by a curve fitting calculation to derive an effective equivalent radius of the back surface. Typical base curve equivalent radii are in the range of 8.2 mm and 9.0 mm, in particular in the range of 8.4 mm and 8.8 mm, with 8.4 mm, 8.6 mm or 8.8 mm being the most commonly used radii.

In addition, the volume formed between the chamfer portion and the upper surface of the flange allows for adjusting the overall volume of the cavity, so that for example the overall volume of the cavity corresponds to the overall volume of the cavity of known packaging containers which are being used. This is advantageous in that the packaging process does not require any modification with respect to the amount of preserving liquid to be filled into the cavity. In particular, the dimensions of the chamfer portion may be chosen such as to compensate for a reduced volume resulting from a reduction of the volume of the bowl portion when compared to known packaging containers being used. For example, the total volume of the cavity may be in the range of 600 µl (microliters) and 900 µl (microliters).

Furthermore, as the dimensions of the bowl portion are reduced the dimensions of the chamfer portion may be chosen such as to maintain the overall drop-shape and the dimensions of the perimeter of the cavity of known packaging containers being used. Accordingly, the chamfer portion advantageously also allows for maintaining the drop-shaped sealing contour and, as a consequence, the sealing tools and sealing parameters for performing the sealing of known packaging containers having the same drop-shaped sealing contour can be used without making modifications to the manufacturing process and apparatus.

Yet further, the chamfer portion surrounding the bowl portion of the cavity forms an inclined transitional surface between the upper surface of the flange and the bowl portion of the cavity. Advantageously, this inclined transitional surface facilitates insertion of a contact lens and preserving liquid into the bowl portion. Vice versa, the chamfer portion forms a shoulder around the bowl portion preventing a contact lens and/or preserving liquid placed in the bowl portion from escaping the bowl portion. In particular, preserving liquid is prevented from spilling out and wetting the sealing zone around the perimeter of the cavity. Wetting of the sealing zone should be avoided since this may result in that the cover foil may not be perfectly sealed to the upper surface of the flange of the shell.

Besides that, the tapered outlet section of the chamfer portion ensures a convenient and easy removal of the contact lens from the cavity. The tapered outlet section forms a tip towards the flange which corresponds to the tip or pointy end of the overall drop-shape of the cavity.

In general, the drop-shape may be symmetrical with regard to a longitudinal center line of symmetry extending between the tip or pointy end of the drop and the bulgy end of the drop. Alternatively, the drop-shape may be asymmetric having its tip or pointy end laterally shifted with regard to an imaginary longitudinal center line of symmetry.

In order to further facilitate removal of the contact lens from the cavity, the bowl portion may include a ramp section tapering away from the at least partially spherical section towards the tapered outlet section of the chamfer portion. Preferably, a transition between the ramp section of the bowl portion and the outlet section of the chamfer portion is at least partially edgeless. In other words, a transition between the surface of the ramp section and the surface of the outlet section is at least partially smooth or continuous. In particular, as used herein, the term continuous is to be understood such that a function which defines the surfaces of the ramp section and the outlet section is continuously differentiable at least partially along the transition between both sections. Advantageously, this ensures a smooth and convenient removal of the contact lens from the at least partially spherical section of the bowl portion via the ramp section and the outlet section.

In contrast, a transition between the at least partially spherical section of the bowl portion and a section of the chamfer portion other than the outlet section may at least partially have an edge. Such an edged transition may be advantageous in that it forms a pronounced shoulder around the at least partially spherical section which—as described above—beneficially prevents undesired escape of the contact lens and/or preserving liquid from the bowl portion.

In order to provide a well-defined housing and a sufficient confinement of the contact lens, the at least partially spherical section of the bowl portion may extend across an azimuthal angular range of at least 180°, in particular of at least 210°, more particular of at least 240°, and even more particular of at least 270° around a center axis of the at least partially spherical section. The center axis extends perpendicular to the upper surface plane through the center of the at least partially spherical section. The ramp section of the bowl portion—if present—closes the residual azimuthal angular range which is left open by the at least partially spherical section of the bowl portion to 360°. Alternatively, in case the bowl portion does not include a ramp section, the at least partially spherical section of the bowl portion may extend across an azimuthal angular range of 360° around the center axis of the at least partially spherical section.

At least in a section other than the tapered outlet section, the chamfer portion may be straight-lined in a cross-sectional plane including the center axis of the at least partially spherical section. This is simple design which is easy to manufacture. For the same reason, the chamfer portion may also be straight-lined in the tapered outlet section. Alternatively, in the tapered outlet section the chamfer portion may also be curved in a cross-sectional plane including the center axis of the at least partially spherical section. A curved tapered outlet section further improves a smooth and convenient removal of the contact lens.

In general, the chamfer portion may be angled with respect to the upper surface plane of the flange by an inclination angle in the range of 20° to 45°. At least in a section other than the tapered outlet section, the inclination angle may be larger than 20°. Here, the chamfer portion may be angled with respect to the upper surface plane of the flange by an inclination angle in the range of 25° and 45°, in particular in the range of 30° and 35°. An inclination angle within this range is advantageous with regard to both preventing the contact lens and preserving liquid from escaping and avoiding modification of the sealing process. Vice versa, in the tapered outlet section the inclination angle may be smaller (although generally being within the range of 20° and 45°), in particular the chamfer portion may be angled with respect to the upper surface plane of the flange by an inclination angle in the range of 20° and 30° or 35°, respectively, and may—for example—increase from the tip of the tapered outlet section, where the inclination angle is smallest, to the inclination angle at the location where the tapered outlet section 42 merges with the section(s) of the chamfer portion other than the tapered outlet section. Advantageously, this provides for a convenient slope of a path along which the contact lens is removed.

The chamfer portion may have a maximum depth in a direction perpendicular to the upper surface plane of the flange which is in the range of 1 mm and 2.5 mm. Likewise, at least along a perimeter of the at least partially spherical section of the bowl portion the chamfer portion may have a radial width parallel to the upper surface plane which is in the range of 1 mm and 2.5 mm. Dimensions within these ranges effectively prevent the contact lens from coming to rest on the small ring-shaped zone about the rim area of the cavity. In addition, these dimensions allow for maintaining the dimensions of the cavity perimeter with smaller dimensions of the bowl portion while at the same time maintaining the overall cavity volume.

For example, at least along a perimeter of the at least partially spherical section of the bowl portion the chamfer portion may have a constant radial width in a direction parallel to the upper surface plane which represents a simple design that is easy to manufacture.

BRIEF DESCRIPTION OF THE DRAWINGS

Further advantageous aspects of the invention become apparent from the following description of embodiments of the invention with the aid of the drawings, in which:

FIGS. 1-5 show a packaging container 1 according to a first embodiment of the invention. The packaging container 1 comprises a shell 2 comprising a concave cavity 10 which is adapted to accommodate a contact lens (not shown), in particular a soft silicone hydrogel contact lens, in a preserving liquid. As can be seen in FIGS. 1-3, the cavity 10 has a substantially drop-like shape. In particular, the cavity 10 has a drop-shaped perimeter 12, and is configured to facilitate removal of the contact lens from the cavity 10. The shell 2 further comprises a flange 20 which has a flat upper surface 22 extending around the drop-shaped perimeter 12 of the cavity 10 in an upper surface plane 24. On its flat upper surface 22, the flange 20 comprises a sealing zone around the perimeter 12 of the cavity 10 substantially following the drop-shaped contour of the cavity perimeter 12. A cover foil (not shown) may be releasably sealed to the flange 20 in this sealing zone such as to hermetically seal the inner volume of the cavity 10. This shell-foil configuration is also often called a blister pack. The shell is typically made of plastics, e.g. from polypropylene, and may be manufactured through injection-molding or deep drawing. The cover foil may be, for example, a laminate comprising an aluminum foil and a polypropylene film. The cover foil may be printed with information regarding the contact lens contained in the packaging container as well as with information for the end-user or the dealer. Sealing of the cover foil to the shell 2 along the sealing zone around the perimeter 12 of the cavity 10 can be performed through the application of heat or ultrasound or by means of other suitable bonding processes.

Figure 3:
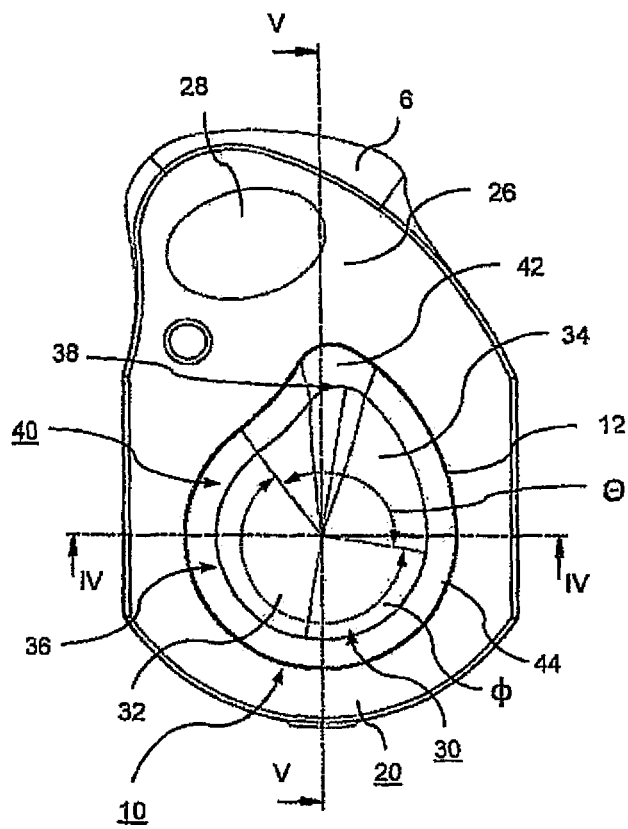
FIG. 3 shows the packaging container of FIG. 1 in a top view.

The shape of the shell 2 can be seen best in the top view shown in FIG. 3. The flange 20 is bounded at two sides by parallel, substantially straight edges. At the other two sides, the flange 20 is bounded by curved edges, one of which has an asymmetrical shape with respect to a center line extending symmetrically between the two parallel straight edges. At the latter side (having the asymmetrical shape), the flange 20 has a grip portion 26 that extends away from the cavity 10 beyond the sealing zone. This grip portion 26 may be covered by a corresponding grip portion of the cover foil. However, in the grip portions, the flange 20 and the cover foil are not sealed to one another, so that the cover foil can be readily lifted off of the flange 20 and can then be peeled off of the shell 2. In the grip portion 26, the flange 20 further comprises an opening 28 having an oval or elliptical shape. The size of the opening 28 is such that a fingertip of a person handling the packaging container 1 can partially reach through that opening 28 and thus push the overlying grip portion of the cover foil off of the grip portion 26 of the flange 20. In addition, the opening 28 provides a more secure grip during handling of the packaging container 1. A front support element 6 is arranged at the tip of the grip portion 26. The front support element 6 is angled (downwards and slightly outwards) with respect to the upper surface plane 24 of the flange 20 and extends at both sides of the curved edge of the grip portion 26. Likewise, the shell 2 comprises a support element 8 at its rear side opposite the grip portion 26 which is angled in a similar manner, but is smaller than the front support element 6. In addition, at each of its parallel longitudinal sides the shell 2 comprises a respective lateral support element 5 that is also angled with respect to the upper surface plane 24 of the flange 20 and also smaller than the front support element 6. The lateral support elements 5 may also serve as grip elements allowing a user to hold the packaging container 1 in principle with three fingers, with two fingers pressing against the lateral support elements 5 arranged at both sides of the shell 2, and the third finger pressing against the front support element 6.

The cavity 10 generally comprises a bowl portion 30 which includes an at least partially spherical section 32, and a chamfer portion 40 surrounding the bowl portion 30 and being arranged between the bowl portion 30 and the drop-shaped perimeter 12 of the cavity 10. The chamfer portion 40 includes a tapered outlet section 42 forming a tip towards the flange 20 to facilitate removal of the contact lens.

Figure 1:
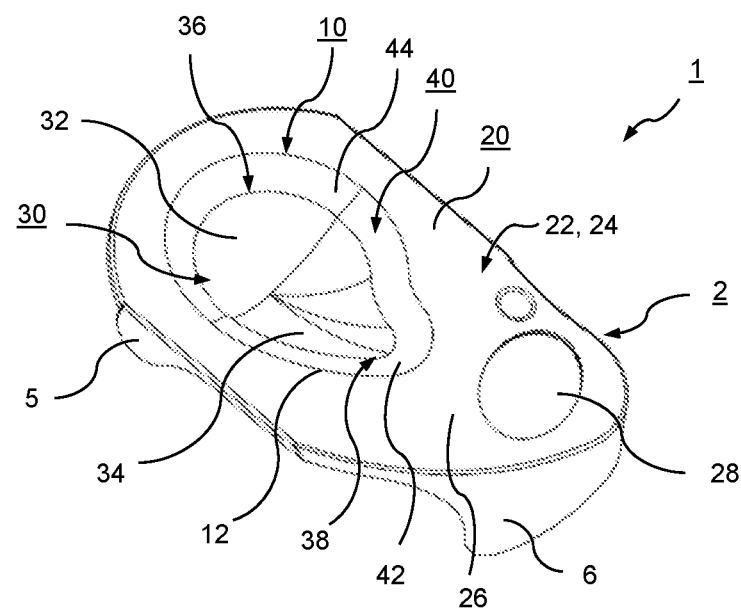
FIG. 1 shows a first embodiment of a packaging container in a perspective view.
Figure 2:
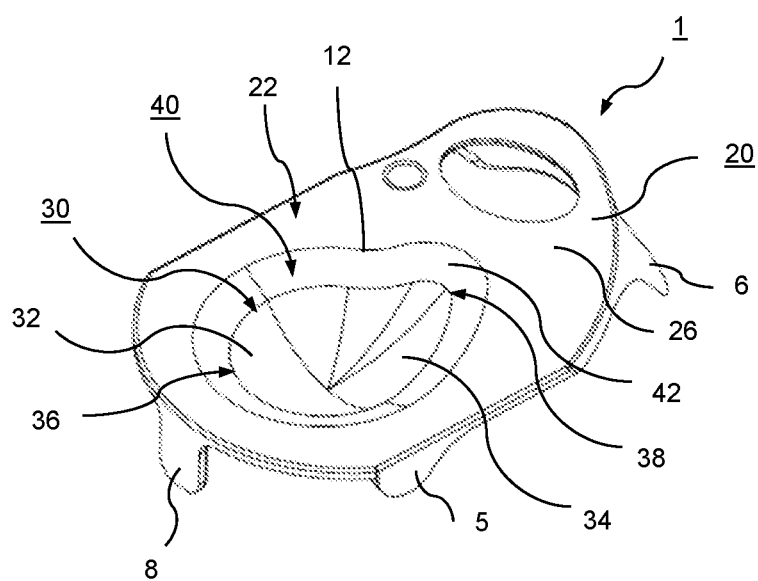
FIG. 2 shows the packaging container of FIG. 1 in another perspective view.

Advantageously, a radius of the at least partially spherical section of the bowl section 30 may be in the range of 7 mm and 9.5 mm, and may in particular be about 9 mm. Further advantageously, the cavity 10 may have a volume in the range of 600 µl and 900 µl. Moreover, the chamfer portion 40 advantageously allows for maintaining the drop-shaped sealing contour and, thus, allows to use the sealing tools and sealing parameters already being used in the process and apparatus for sealing known packaging containers having the same drop-shaped perimeter of the cavity With regard to the first embodiment of the packaging container 1 shown in FIGS. 1-5, the bowl portion 30 includes a ramp section 34 in addition to the partially spherical section 32. As can be seen in FIGS. 1-3, the partially spherical section 32 extends across an azimuthal angular range $\phi$ of at least 180°, in the embodiment shown about 222°, around a center axis Z of the partially spherical section 32. The center axis Z extends perpendicular to the upper surface plane 24 through the center of the partially spherical section 32.

The residual azimuthal angular range $\Theta$ left open by the partially spherical section 32 is closed or occupied by the ramp section 34. Within this residual azimuthal angular range $\Theta$, the ramp section 34 tapers away from the partially spherical section 32 towards the tapered outlet section 42 in a radial outward direction in a manner such as to smoothly merge into the outlet section 42 of the chamfer portion 40. Accordingly, the outer perimeter of the ramp section 34 towards the tapered outlet section 42 is non-circular, but substantially follows the drop-shaped perimeter of the cavity 10 within this residual azimuthal angular range $\Theta$.

Figure 5:
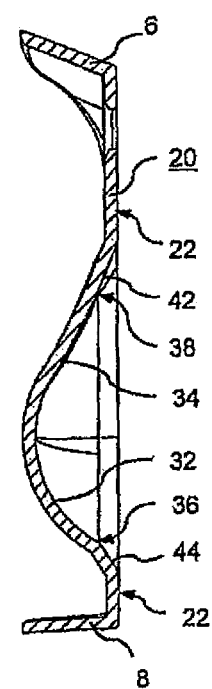
FIG. 5 shows the packaging container of FIG. 1 in a cross-sectional view along line V-V according to FIG. 3.

Advantageously, the transition 38 between the ramp section 34 of the bowl portion 30 and the tapered outlet section 42 of the chamfer portion 40 is at least partially smooth and edgeless as can be seen in FIG. 5. In contrast thereto, a transition 36 between the partially spherical section 32 of the bowl portion 30 and section(s) 44 of the chamfer portion 40 other than the outlet section 42 is edged, i.e. has an edge. Of course, a transition 38 between the outlet section 42 and the ramp section 38 may also have an edge, at least partially in those areas of the transition 38 which are adjacent to or close to the transition 36 between the other section(s) 44 of the chamfer portion 40 and the partially spherical section 32 of the bowl portion 30.

Figure 4:
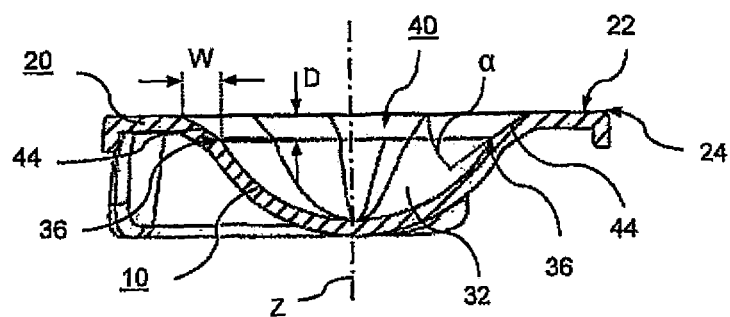
FIG. 4 shows the packaging container of FIG. 1 in a cross-sectional view along line IV-IV according to FIG. 3.

The chamfer portion 40 has a constant radial width W in a direction parallel to the upper surface plane 24 which is in the range of 1 mm and 2.5 mm, as shown in FIG. 4.

Primarily, this holds for the azimuthal angular range $\phi$, that is to say at least along a perimeter of the at least partially spherical section 32 of the bowl portion 30. As can be seen in FIG. 3, this also holds for most of the chamfer portion 40 within the residual azimuthal angular range $\Theta$, that is, along the majority of the outer perimeter 12 within the residual azimuthal angular range $\Theta$. In the other parts, in particular within the small sector forming the tip of the chamfer portion, the outlet portion 42 has a larger radial width.

The chamfer portion 40 further has a maximum depth D in a direction perpendicular to the upper surface plane 24 which is in the range of 1 mm and 2.5 mm as illustrated in FIG. 4. Basically, this holds along the entire perimeter of the chamfer portion 40, that is, along the entire perimeter 12 of the cavity 10.

In a cross-sectional plane including the center axis Z, as shown in FIGS. 4 and 5, the chamfer portion 40 is straight-lined at least in section(s) 44 other than the tapered outlet section 42 such as to form the above-mentioned edge between the section(s) 44 of the chamfer portion 40 and the at least partially spherical section 32 of the bowl portion 30. As can be also seen in FIGS. 4 and 5, the chamfer portion 40 is angled with respect to the upper surface plane 24 of the flange 20 by an inclination angle α in the range of 30° and 45°, and is constant. This holds for section(s) 44 other than the tapered outlet section 42.

In contrast, for the residual azimuthal angular range Θ, i.e. in the tapered outlet section 42, the chamfer portion in a cross-sectional plane including the center axis Z has an inclination angle β in the range of 20° and 45° which may increase from the tip of the tapered outlet section 42, where the inclination angle β is smallest, to the inclination angle at the location where the tapered outlet section 42 merges with the other section(s) 44 of the chamfer portion, as shown in FIG. 5. Advantageously, this provides a smooth and convenient removal of the contact lens from the cavity 10. As mentioned above, the chamfer portion may be straight-lined also in those areas of the transition 38 which are adjacent to or close to the transition 36 between the other section(s) 44 of the chamfer portion 40 and the partially spherical section 32 of the bowl portion 30.

Notwithstanding the different slopes and cross-sectional profiles of the chamfer portion 40 in section(s) 44 and the outlet section 44, the chamfer portion 40—taken as a whole—forms an inclined transitional surface between the upper surface 22 of the flange 20 and the bowl portion 30 of the cavity 10. Advantageously, this inclined transitional surface facilitates insertion of a contact lens and preserving liquid into the bowl portion 30. Vice versa, the chamfer portion 40 forms a shoulder around the bowl portion 30 preventing a contact lens and/or preserving liquid introduced into the bowl portion 30 from escaping the bowl portion. In particular, preserving liquid is prevented from spilling out and thus from wetting the sealing zone around the perimeter 12 of the cavity 10.

Figure 6:
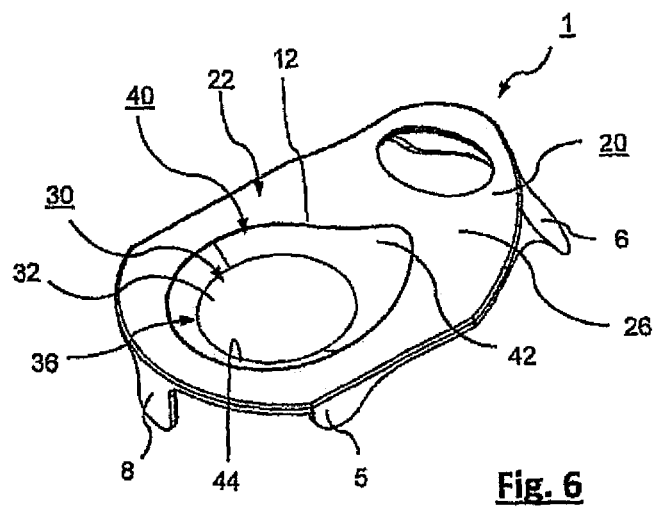
FIG. 6 shows a second embodiment of a packaging container in a perspective view.
Figure 7:
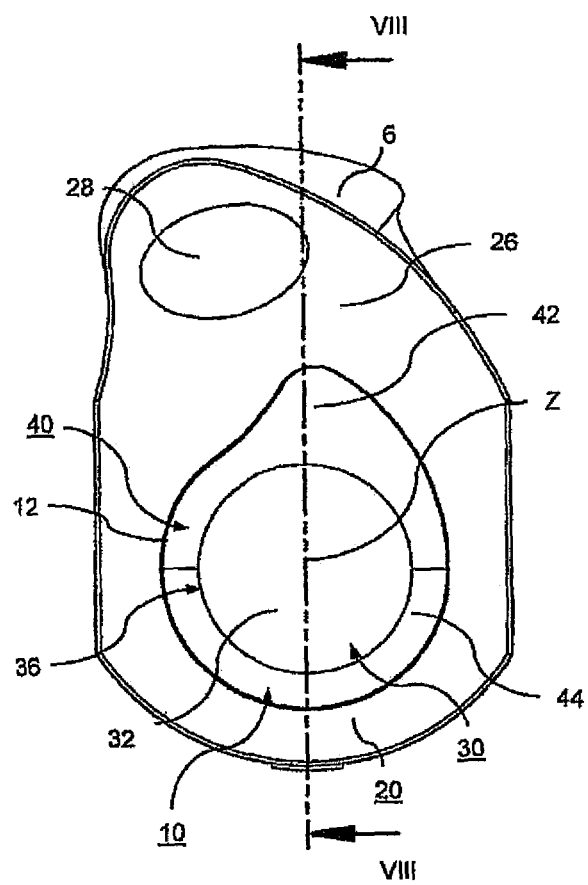
FIG. 7 shows the packaging container of FIG. 6 in a top view.
Figure 8:
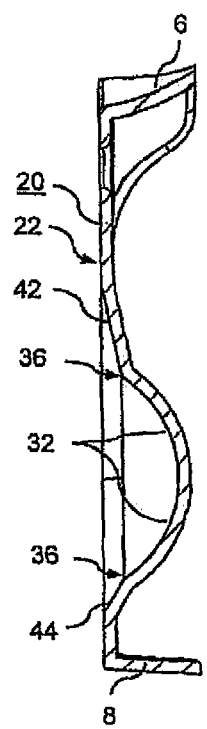
FIG. 8 shows the packaging container of FIG. 6 in a cross-sectional view along line VIII-VIII according to FIG. 7.

FIGS. 6-8 show a packaging container 1 according to a second embodiment of the invention. The packaging container 1 according to the second embodiment is very similar to the packaging container 1 according to the first embodiment shown in FIGS. 1-5. For this reason, similar or identical features are denoted with identical reference signs. In contrast to the first embodiment, the bowl portion 30 of the packaging container 1 according to the second embodiment does not comprise a ramp section. Instead, the bowl portion comprises a spherical portion 32 extending across a full azimuthal angular range φ of 360° around center axis Z. Accordingly, a transition 36 between the spherical portion 32 and the surrounding chamfer portion 40 has a circumferential edge. Advantageously, the second embodiment of the packaging container 1 provides a very simple design that is easy to manufacture.

The invention has been described with reference to the embodiments shown in FIGS. 1-8. However, for the skilled person it is evident that many changes and modifications can be made without departing from the general teaching underlying the invention. Therefore, the scope of protection is not intended to be limited to the embodiments described but rather is defined by the appended claims.

The invention claimed is:

1. A packaging container (1) for a contact lens, in particular for a silicone hydrogel contact lens, the packaging container (1) comprising a shell (2), wherein the shell (2) comprises:
   a cavity (10) having a drop-shaped perimeter (12), and
   a flange (20) having a flat upper surface (22) extending around the drop-shaped perimeter (12) of the cavity (10) in an upper surface plane (24),
   wherein the cavity (10) comprises:
      a bowl portion (30) including an at least partially spherical section (32) for accommodating the contact lens, and
      a chamfer portion (40) surrounding the bowl portion (30) and being arranged between the bowl portion (30) and the drop-shaped perimeter (12) of the cavity (10), wherein the chamfer portion (40) includes a tapered outlet section (42) forming a tip towards the flange (20) to facilitate removal of the contact lens from the cavity (10).

2. The packaging container (1) according to claim 1, wherein the bowl portion (30) further includes a ramp section (34) tapering away from the at least partially spherical section (32) towards the tapered outlet section (42) of the chamfer portion (40).

3. The packaging container (1) according to claim 2, wherein a transition (38) between the ramp section (34) of the bowl portion (30) and the outlet section (42) of the chamfer portion (40) is at least partially edgeless.

4. The packaging container (1) according to claim 1, wherein a transition (36) between the at least partially spherical section (32) of the bowl portion (30) and a section of the chamfer portion (40) other than the outlet section (42) has an edge.

5. The packaging container (1) according to claim 1, wherein the at least partially spherical section (32) of the bowl portion (30) extends across an azimuthal angular range (φ) of at least 180° around a center axis (Z) of the at least partially spherical section (32), the center axis (Z) extending perpendicular to the upper surface plane (24) through the center of the at least partially spherical section (32).

6. The packaging container (1) according to claim 1, wherein the chamfer portion (40) is angled with respect to the upper surface plane (24) of the flange (20) by an inclination angle (α) in the range of 20° and 45°.

7. The packaging container (1) according to claim 1, wherein at least in a section (44) other than the tapered outlet section (42) the chamfer portion (40) is angled with respect to the upper surface plane (24) of the flange (20) by an inclination angle (α) in the range of 25° and 45°.

8. The packaging container (1) according to claim 1, wherein in the tapered outlet section (42) the chamfer portion (40) is angled with respect to the upper surface plane (24) of the flange (20) by an inclination angle in the range of 20° and 45°.

9. The packaging container (1) according to claim 5, wherein at least in a section (44) of the chamfer portion (40) other than the tapered outlet section (42), the chamfer portion (40) is straight-lined in a cross-sectional plane including the center axis (Z) of the at least partially spherical section (32).

10. The packaging container (1) according to claim 1, wherein in the tapered outlet section (42) the chamfer portion (40) is straight-lined in a cross-sectional plane including the center axis (Z) of the at least partially spherical section (32).

11. The packaging container (1) according to claim 1, wherein the chamfer portion (40) has a maximum depth (D) in a direction perpendicular to the upper surface plane (24) which is in the range of 1 mm and 2.5 mm.

12. The packaging container (1) according to claim 1, wherein at least along a perimeter of the at least partially spherical section (32) of the bowl portion (30) the chamfer portion (40) has a radial width (W) in a direction parallel to the upper surface plane (24) which is in the range of 1 mm and 2.5 mm.

13. The packaging container (1) according to claim 1, wherein at least along a perimeter of the at least partially spherical section (32) of the bowl portion (30) the chamfer portion (40) has a constant radial width (W) parallel to the upper surface plane (24).

14. The packaging container (1) according to claim 1, wherein a radius of the at least partially spherical section (32) of the bowl section is in the range of 7 mm and 9.5 mm.

15. The packaging container (1) according to claim 1, further comprising a cover foil configured to be sealingly attached to the shell (2) in a sealing zone on the upper surface (22) of the flange (20).

* * * * *